US006592193B1

(12) United States Patent
Curry

(10) Patent No.: US 6,592,193 B1
(45) Date of Patent: Jul. 15, 2003

(54) COMPUTER MONITOR SCREEN COVER AND STORAGE UNIT

(76) Inventor: Daniel J. Curry, 1614 Hunt Ave., Richland, WA (US) 99352

( * ) Notice: Subject to any disclaimer, the term of this patent is extended or adjusted under 35 U.S.C. 154(b) by 0 days.

(21) Appl. No.: 09/884,011

(22) Filed: Jun. 18, 2001

(51) Int. Cl.[7] .................................................. A47B 5/00
(52) U.S. Cl. ........................ 312/7.2; 312/204; 348/841; 248/918
(58) Field of Search ...................... 312/7.2, 204, 223.2, 312/321.5, 327; 348/836, 841, 842; 40/620, 124.06, 492; 248/918, 447.1, 291.1

(56) References Cited

U.S. PATENT DOCUMENTS

| | | | | |
|---|---|---|---|---|
| 3,031,526 A | * | 4/1962 | Oberstein | 348/841 |
| 3,408,032 A | * | 10/1968 | Francis | 248/447.1 |
| 4,082,388 A | * | 4/1978 | Goeglein | |
| 4,880,300 A | * | 11/1989 | Payner et al. | 248/918 |
| 5,301,915 A | * | 4/1994 | Bahniuk et al. | 248/918 |
| 5,320,318 A | * | 6/1994 | Chen | 248/918 |
| 5,328,145 A | * | 7/1994 | Charapich | 248/442.2 |
| 5,499,793 A | * | 3/1996 | Salansky | 248/918 |
| 5,668,612 A | * | 9/1997 | Hung | 248/918 |
| 5,759,644 A | * | 6/1998 | Stanley | |
| 5,803,652 A | * | 9/1998 | Martin | |
| 6,133,966 A | * | 10/2000 | Dyballa | 248/918 |
| 6,188,450 B1 | * | 2/2001 | Coons | 348/841 |
| 6,209,973 B1 | * | 4/2001 | Steinberg | 348/841 |
| 6,382,743 B1 | * | 5/2002 | Gollob | 312/328 |
| 6,412,744 B1 | * | 7/2002 | Wollam et al. | 248/442.2 |

FOREIGN PATENT DOCUMENTS

| | | | | |
|---|---|---|---|---|
| DE | 3343339 | * | 6/1985 | |
| EP | 0385037 | * | 9/1990 | |
| GB | 2084461 | * | 4/1982 | 312/204 |

* cited by examiner

Primary Examiner—Lanna Mai
Assistant Examiner—Hanh V. Tran
(74) Attorney, Agent, or Firm—Liebler, Ivery & Connor; Floyd E. Ivey

(57) ABSTRACT

An apparatus which rotatably covers and exposes a computer monitor screen. Storage and display containers and shelves are affixed to the inside and or outside surfaces of the apparatus allowing a computer operator to store and display items.

11 Claims, 5 Drawing Sheets

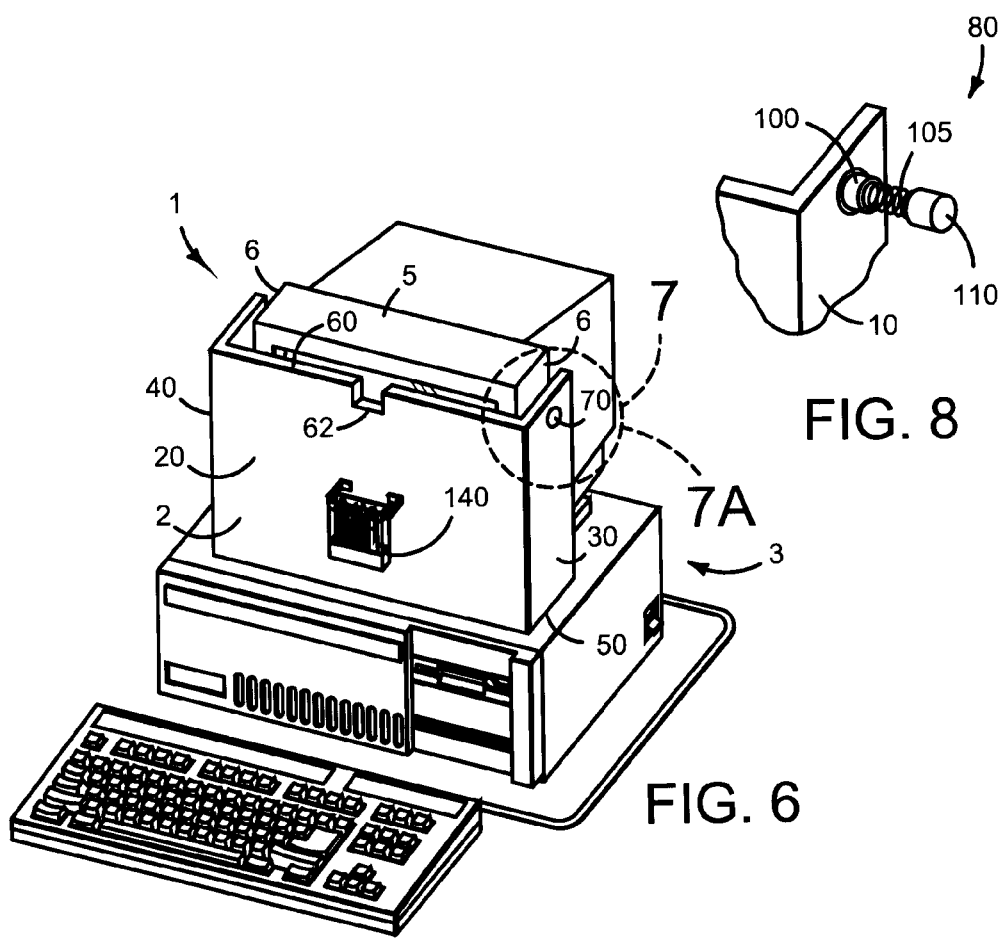
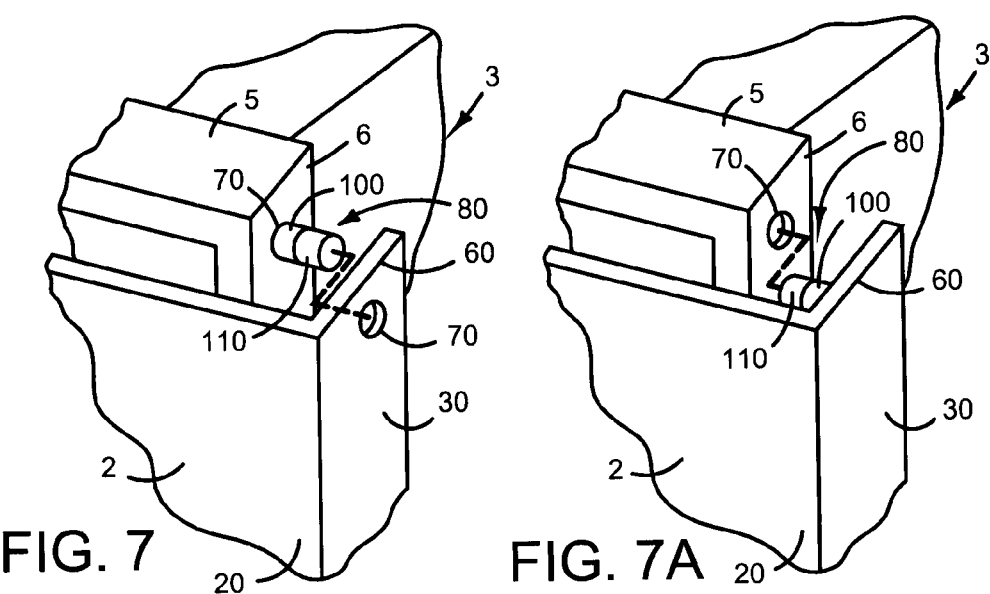

COMPUTER MONITOR SCREEN COVER AND STORAGE UNIT

FIELD OF THE INVENTION

The present disclosure relates the covering of computer monitors and storage of miscellaneous personal property by computer operators.

BACKGROUND OF THE INVENTION

Computer operators frequently occupy cubicles of limited space including limited storage space. The availability of space for the placement of items of personal property, such as photographs of family, medicines, cosmetics and the like, in a convenient location is desired by many individuals whose jobs are primarily centered around the operation of personal computers. U.S. Pat. No. 4,082,388 to Goeglein discloses a collapsible display booth, U.S. Pat. No. 5,803,562 to Jacobs regards a self-contained portable office and U.S. Pat. No. 5,759,644 to Stanley demonstrates decorative computer monitor cover.

The foregoing patents and printed publications are provided herewith in an Information Disclosure Statement in accordance with 37 CFR 1.97.

SUMMARY OF THE INVENTION

The apparatus disclosed herein is a structure which pivots closed over the screen of a computer monitor and pivots open to rest, in a generally vertical position, on the top of a computer monitor. The apparatus, when open, presents a computer operator with space for storage and placement of personal property items. The outer surface of the apparatus will be viewed when the apparatus is closed. The inner surface is viewed when the apparatus is open. A variety of storage means, including cabinets, shelves, cork board and the like will be affixed at the inner surface such that the storage means is accessible when the apparatus is rotated to the open position.

BRIEF DESCRIPTION OF THE DRAWINGS

The foregoing and other features and advantages of the present disclosure will become more readily appreciated as the same become better understood by reference to the following detailed description of the preferred embodiment and additional embodiments of the disclosure when taken in conjunction with the accompanying drawings, wherein:

FIG. 6 is a view showing the apparatus rotated or pivoted to the closed position to cover the computer screen.

FIG. 7 is an exploded detail from FIG. 6 of a mounting means comprised of a spring biased cylinder with cylinder cap affixed to the computer monitor to be received into an aperture in the apparatus first side. A like apparatus will be suggested, by this illustration at the apparatus second side.

FIG. 7A is an exploded detail from FIG. 6 of a mounting means comprised of a spring biased cylinder with cylinder cap affixed at the apparatus first side at the apparatus inside surface and received into an aperture means in the computer monitor. A like apparatus will be suggested, by this illustration at the apparatus second side.

FIG. 8 is an exploded illustration of a mounting means comprised of a spring biased cylinder with cylinder cap affixed at the first side of the apparatus inside surface.

DETAILED DESCRIPTION

Figure 2:
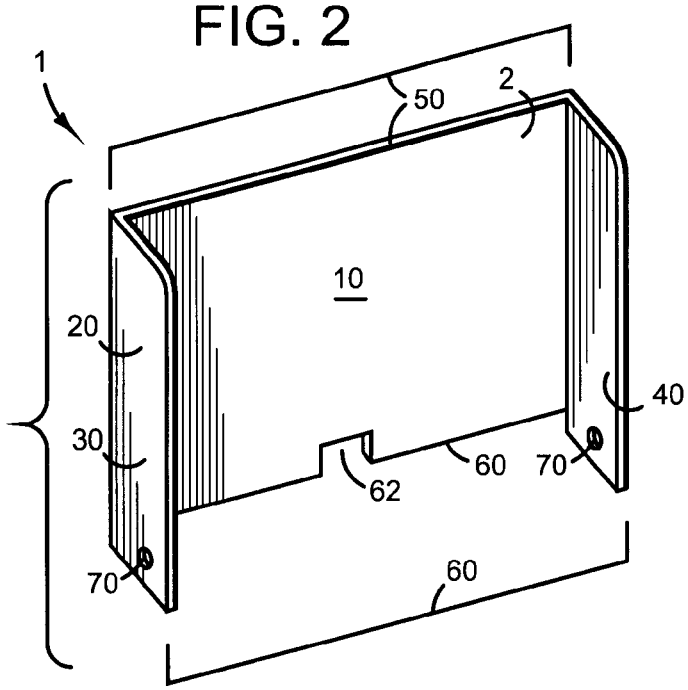
FIG. 2 is a perspective elevation showing of the apparatus showing the outside and inside surfaces and mounting means. Also illustrated are the top and bottom plan views.
Figure 3:
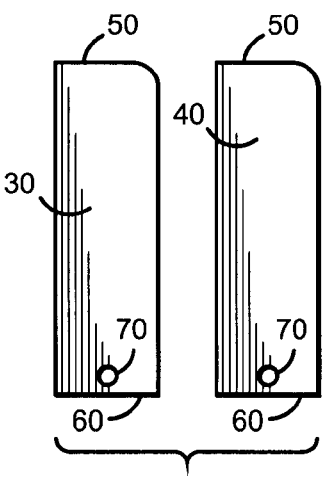
FIG. 3 shows first and second side elevations.
Figure 1:
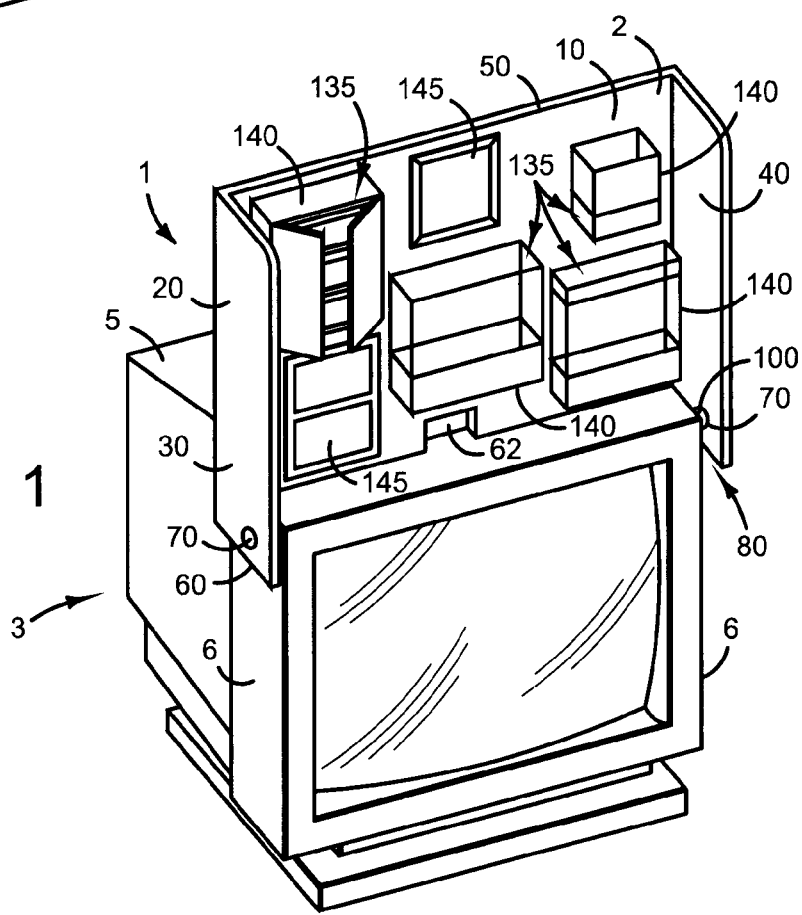
FIG. 1 is a perspective showing the apparatus in the open position affixed to a computer monitor. Demonstrated are storage means and items of personal property used by a computer operator.

The Computer Monitor Screen Cover and Storage Unit apparatus 1 disclosed herein is illustrated in FIGS. 1 through 7, 7A, 8 and 9. The apparatus 1 is illustrated in FIGS. 1, 2, 4, 5, 6, 7, 7A and 9 showing a cover 2 having an inside and outside surface 10, 20, a first and second side 30, 40, a bottom and top 50, 60 and a mounting means fixture 70. The cover 2 will be constructed from a rigid or semi rigid material including but not limited to, for example, metal, plastic, composite material and paper board.

Figure 4:
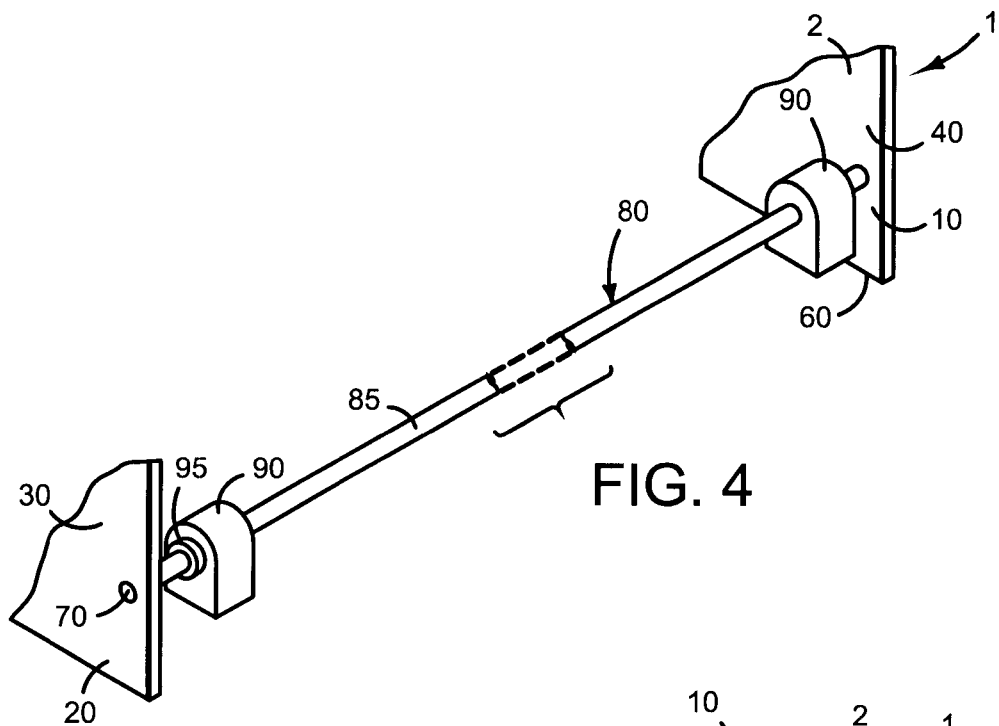
FIG. 4 is illustrative of a mounting means for securing the apparatus to a computer monitor.
Figure 5:
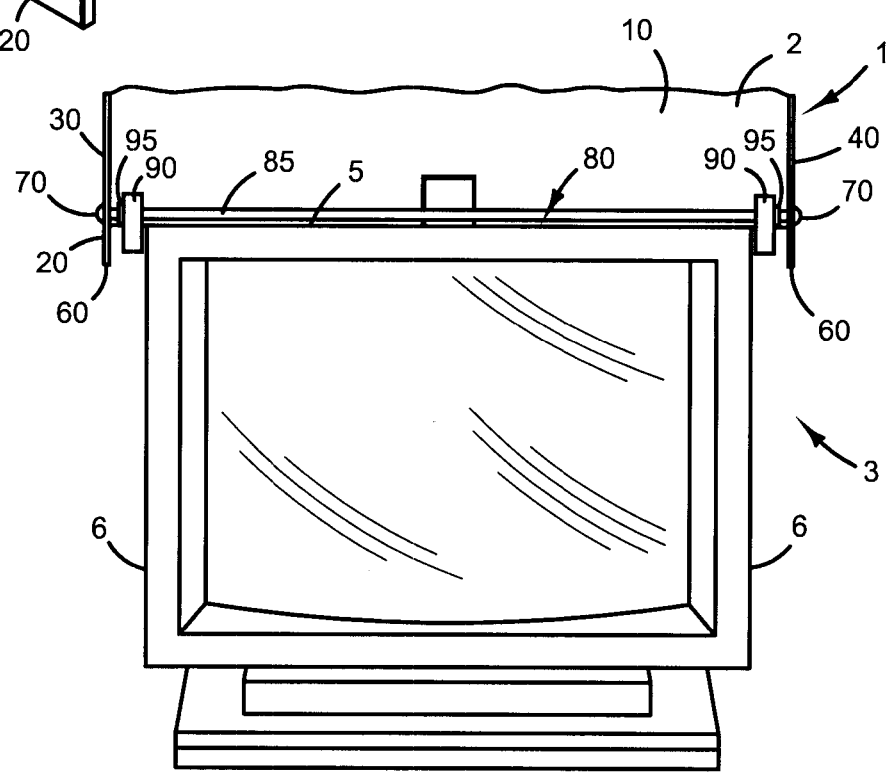
FIG. 5 illustrates the suggested mounting means of FIG. 4 securing the apparatus to a computer monitor.
Figure 9:
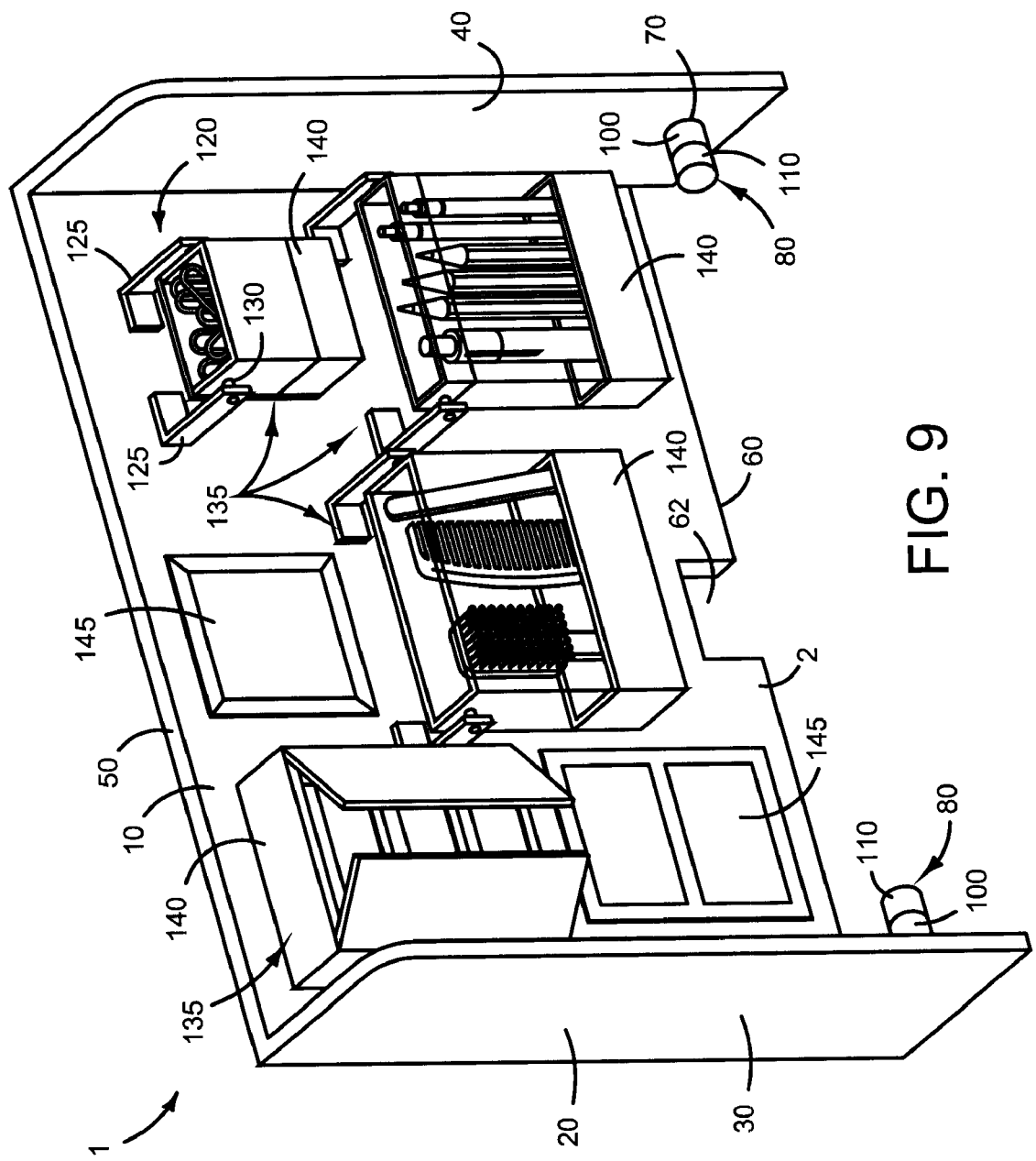
FIG. 9 illustrates the apparatus having storage means for a variety of personal property and other items used by a computer operator.
Figure 10:
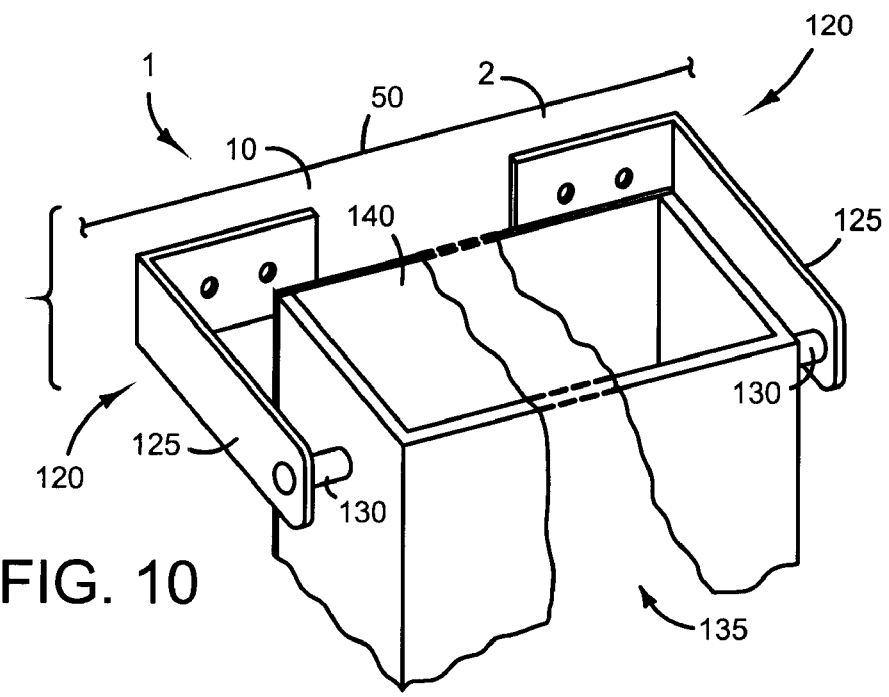
FIG. 10 illustrates one mounting technique allowing stored items to remain upright when the apparatus is moved from open to closed and back to open. Illustrated is an axle mounting arrangement permitting a rotatable mount for a storage unit.
Figure 11:
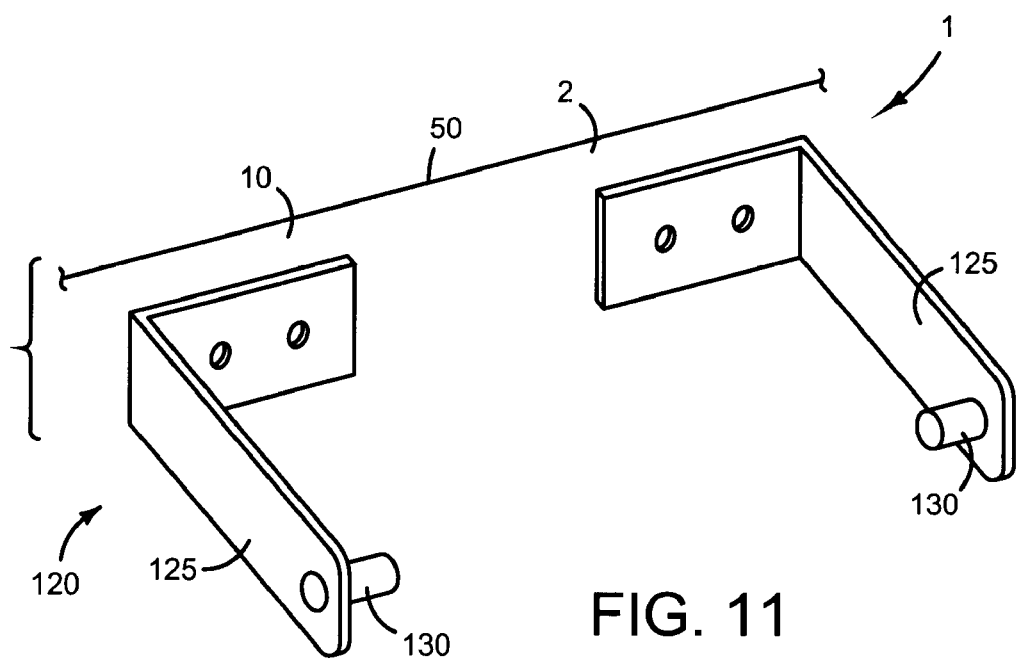
FIG. 11 illustrates the mounting means and axle mounting arrangement of FIG. 10.

The apparatus 1 mounted at a computer monitor 3 having a monitor top 5 and monitor sides 6 with a mounting means 80 is illustrated in FIGS. 1, 5, 6, 7 and 7A. The apparatus 1 proximal the top 60 mounted by mounting means 80 proximal the monitor top 5. Mounting means 80 is demonstrated in FIGS. 1, 4, 5, 6, 7, 7A, 8 and 9. Mounting means 80 is composed of a structure allowing a rotatable interconnection of the apparatus at the top 60 with the mounting means 80, in the preferred embodiment, at the first and second side 10, 20. Mounting means 80 may be composed of a means of urging a cover mounting block 90 against the computer monitor 3 such as to grasp the computer monitor 3 or be secured to the computer monitor 3 so as to allow a rotation of the apparatus 1 to cover the computer monitor 3 screen when closed and to allow the apparatus 2 to rotate to expose the computer monitor 3 screen and to be upright and available to present the inside surface 10 to a computer operator. The mounting means 80 suggested in FIGS. 4 and 5 is comprised of a cover mounting axle 85 which, in the preferred embodiment, is threaded, at least one cover mounting block 90 which is urged into contact with the computer monitor 3 by means including, in the preferred embodiment and as shown in FIGS. 4 and 5, by a cover mounting block securing means composed, for example, of a nut or of a nut with a set screw or other such securing means. The mounting means 80 of FIGS. 4 and 5 allows the apparatus 1 to be rotatably secured to the computer monitor 3 with rotation or swiveling realized around the cover mounting axle 85 interconnection with the apparatus 1. Interconnection with the apparatus 1, in the preferred embodiment, is at least one mounting means fixture 70 positioned, in the preferred embodiment, at each of the first and second sides 30, 40. The at least one mounting means fixture 70 may be comprised of an aperture receiving, for example mounting means 80 including a cover mounting axle 85 or other mounting means 80 structure. The at least one mounting means fixture 70 may, in an alternative embodiment, be positioned in or at or on the computer monitor 3 where there will be received mounting means 80 interconnecting with the apparatus 1. It will be appreciated that the at least one cover mounting block 90 may additionally be affixed with affixing means, including adhesive means and mechanical means including for example screw means, to or with the computer monitor 3. A video opening 62 at the top 60 is illustrated in FIGS. 1, 2, 6 and 9 and will be appreciated to be a slot or cutout to accommodate a device such as a monitor top 5 mounted video camera.

An alternative mounting means 80 is suggested in FIGS. 1, 6, 7, 7A, 8, and 9 wherein a spring bias means is rotatably secured to and between the apparatus 1 and the computer monitor 3. Illustrated is a spring bias receptacle 100 receiving a spring bias means 105 which is in turn received into a mounting cap 110. In the preferred embodiment the mounting cap 110 may either circumferentially surround or be surrounded by the spring bias receptacle. The spring bias means 105 will urge the mounting cap 110 away from the spring bias receptacle 100. A stop means will prevent the disconnection of the mounting cap 110 from the spring bias receptacle 100. Spring bias means 105 may be provided, for example by a coil spring, an elastic compressible material or other material or means having a spring function as will be readily appreciated by those of ordinary skill in the spring biasing arts. The mounting means 80 will be interconnected by interconnection or affixing means between and with the computer monitor 3 and apparatus 1 at least one mounting means fixture 70.

The preferred embodiment of the invention of apparatus 1 is the structure allowing storage and display for the computer operator. Illustrated in FIGS. 1, 9, 10 and 11 are a variety of storage means 135 including storage units 140 and display means 145. Storage units may be comprised of shelves, cabinets, containers and other strictures recognized by those of ordinary skill in the storage and container arts which may contain, for example, pencils, drafting implements, books, cosmetics, medicines and other items of personal, business and professional use. Display means 145 may include, for example, mirrors and mounting surfaces, comprising for example bulletin board structures and cork board, for receiving and mounting bulletins, memorandums, notices, photographs and other such items. Illustrated in FIGS. 9, 10 and 11, for storage items requiring an upright position when the apparatus 1 is in either an open or closed position, is a storage swivel mount means 120 comprising, for example, at least one storage swivel mounting bracket 125 and rotatable mounting means at a storage unit 140 or display means 145 allowing swiveling the storage unit 140 or display means 145 as the cover 2 is rotated. Rotatable mounting means provided, for example, by storage swivel mounting axles 130 received between the mounting bracket 125 and a storage unit 140 or display means 145 to allow the storage unit 140 or display means 145 to swivel or rotate as the apparatus 1 is moved from open to close to open and thus retain a particular orientation regardless of the position of the apparatus 1. It will be recognized that storage and display means 135, 145 will, in the preferred embodiment, be affixed to the inside surface 10 but, in alternative embodiments may be affixed to the outside surface 20. Such storage and display means 135, 145 may be affixed by affixing means including for example adhesives, rivets, brackets, screws and other such affixing means as will be recognized by those of ordinary skills in the securing and affixing arts. Storage and display means 135, 145 mounting involving the means of rotatable mounting will find storage swivel mounting means 120 mounted to the inside or outside surface by affixing means including adhesives, rivets, screws and other such affixing means appreciated by those of ordinary skills.

While a preferred embodiment of the present disclosure has been shown and described, it will be apparent to those skilled in the art that many changes and modifications may be made without departing from the disclosure in its broader aspects. The appended claims are therefore intended to cover all such changes and modifications as fall within the true spirit and scope of the disclosure.

I claim:

1. A computer monitor screen cover and storage unit comprising:
   A. a cover having an inside surface and an outside surface, a top, first and second sides and a bottom; pivotal connection means at the top for mounting to a computer monitor, having a monitor top and monitor sides, proximal the monitor top;
   B. the outside surface displayed when the cover is pivoted to a closed position around a pivot point of the pivotal connection means and the side of the computer monitor; the inside surface displayed when the cover is rotated to a raised position;
   C. the inside and the outside surfaces having storage and display means affixed thereto.

2. A Computer Monitor Screen Cover and Storage Unit comprising:
   A. a cover (2) having an inside surface and an outside surface (10, 20), a first and a second side (30, 40), a bottom and a top (50, 60) and a mounting means fixture (70);
   B. the cover (2) rotatably mounted at a computer monitor (3) having a monitor top (5) and monitor sides (6) with a mounting means (80); the cover (2) rotatably mounted at the computer monitor (3) proximal the monitor top (5) and proximal the top (60), wherein the outside surface displayed when the cover is pivoted to a closed position around the monitor top covering the screen of the monitor, and the inside surface displayed when the cover is rotated to a raised open position exposing the screen;
   C. storage means (135) and display means (145) affixed by affixing means at the inside surface or the outside surface.

3. The screen cover and storage unit of claim 2, wherein:
   A. the cover (2) constructed from a rigid or semi rigid material;
   B. said mounting means (80) is composed of a structure allowing a rotatable interconnection of the cover at the top (60) relative to the computer monitor (3) monitor top(5);
   C. said storage means (135) and display means, (145) affixed by affixing means at the inside surface;
   D. said storage means including storage units (140).

4. The screen cover and storage unit of claim 3, wherein:
   A. said mounting means (80) affixed at the first side and the second side (10, 20); said mounting means (80) is composed of a means of urging a cover mounting block (90) against the computer monitor (3) to grasp the computer monitor (3) or to be secured to the computer monitor (3);
   B. said storage units comprised of shelves, cabinets, containers and other container means structures; said display means is of mirrors and mounting surfaces;
   C. a video opening at the top.

5. The screen cover and storage unit of claim 4, wherein:
A. said mounting means (80) is comprised of a cover mounting axle (85), at least one cover mounting block (90) which is urged into contact with the computer monitor (3) by means;
B. said display means comprising bulletin board structures for receiving and mounting bulletins, memorandums, notices, photographs and other such items.

6. The screen cover and storage unit of claim 5, wherein:
A. said storage means and display means mounted at the inside surface or outside surface with a storage swivel mount means (120);
B. means urging the at least one cover mounting block (90) into contact with the computer monitor (3) comprised of a nut or a nut with a set screw.

7. The screen cover and storage unit of claim 6, wherein:
A. said storage swivel mount means (120) comprising at least one storage swivel mounting bracket (125) and at least one storage swivel mounting axle (130) received by swivel means at a storage unit (140) or display means (145) to allow the storage unit (140) or the display means (145) to swivel or rotate as the cover (2) is moved from open to close to open and thus retain a particular orientation regardless of the position of the cover (2);
B. the at least one cover mounting block (90) is affixed with affixing means to the computer monitor.

8. The screen cover and storage unit of claim 7, wherein:
B. said swivel mounting means (120) mounted to the inside surface or the outside surface by affixing means;
C. at least one mounting means fixture (70) positioned at each of the first and second sides (30, 40); the at least one mounting means fixture (70) comprised of an aperture receiving mounting means (80).

9. The screen cover and storage unit of claim 4, wherein:
A. said mounting means (80) is comprised of a spring bias means which is rotatably secured to and between the apparatus (1) and the computer monitor (3);
B. said display means comprising bulletin board structures for receiving and mounting bulletins, memorandums, notices, photographs and other such items.

10. The screen cover and storage unit of claim 9, wherein:
A. a spring bias receptacle (100) receiving the spring bias means (105) which is in turn received by a mounting cap (110); the spring bias means (105) is positioned to urge the mounting cap (110) away from the spring bias receptacle (100); the mounting means (80) is interconnected by interconnection or affixing means between and with the computer monitor (3) and the cover (2) at the at least one mounting means fixture (70).

11. The screen cover and storage unit of claim 10, wherein:
A. the mounting cap (110) either circumferentially surrounds or is surrounded by the spring bias receptacle;
B. a stop means prevents the disconnection of the mounting cap (110) from the spring bias receptacle (100).

* * * * *